United States Patent
Liversidge

[11] Patent Number: 5,713,249
[45] Date of Patent: Feb. 3, 1998

[54] WIRE STRIPPER

[76] Inventor: Barry Peter Liversidge, 1 The Firs, Layer-de-la-Haye, Colchester, Essex C02 0DU, England

[21] Appl. No.: 513,930
[22] PCT Filed: Mar. 4, 1994
[86] PCT No.: PCT/GB94/00427
  § 371 Date: Sep. 1, 1995
  § 102(e) Date: Sep. 1, 1995
[87] PCT Pub. No.: WO94/21016
  PCT Pub. Date: Sep. 15, 1994

[30] Foreign Application Priority Data

Mar. 6, 1993 [GB] United Kingdom .................. 9304592
Sep. 17, 1993 [GB] United Kingdom .................. 9319247

[51] Int. Cl.⁶ .................................................. H02G 1/12
[52] U.S. Cl. ..................................... 81/9.43; 81/9.41
[58] Field of Search ............................... 81/9.43, 9.41, 81/9.42, 9.44, 9.4

[56] References Cited

U.S. PATENT DOCUMENTS 3,915,037  10/1975  Wiener ............................ 81/9.43
4,407,174  10/1983  Schulze .......................... 81/9.42
4,485,696  12/1984  Bieganski ....................... 81/9.41

FOREIGN PATENT DOCUMENTS 2083400  8/1981  United Kingdom ............... 81/9.43

Primary Examiner—D. S. Meislin
Assistant Examiner—Joni B. Danganan
Attorney, Agent, or Firm—Andrus, Sceales, Starke & Sawall

[57] ABSTRACT

A wire stripper has a main body (10) in which are mounted a pair of clamping jaws (11, 14) for a wire to be stripped and within the clamping jaws, a pair of stripping jaws (17, 18). An operating mechanism includes a pivoting handle (30) which carriers an actuator (34) defining a cam profile (37, 38). Clamping jaw (14) has a cam follower (43) which cooperates with the cam profile (37, 38) and the actuator (34) is also coupled to the stripping jaws (17, 18) to effect linear sliding movement thereof. During operation, the mechanism serves to increase the clamping force on a wire being stripped should the stripping jaws encounter resistance to movement. The mechanism gives a smooth operation with a substantially constant velocity ratio between the movement of the stripping jaws (17, 18) and the movement of the handle (27).

20 Claims, 3 Drawing Sheets

WIRE STRIPPER

This invention relates to a wire stripper—that is to say, a tool for separating and at least partially removing an end portion of an outer layer of an elongate filamentary member having an inner core surrounded by said outer layer.

In the following, the invention will exclusively be defined and described with reference to the stripping of an electrical wire, having an inner core conductor and an outer insulating layer. It will however be understood that the invention may be used to remove an end portion of an outer layer surrounding a different kind of core member—for example, an outer sheath surrounding a fibre optic cable. As such, the terms "wire" and "insulation" as used herein should be interpreted broadly.

There have been numerous designs of hand-held and operated wire strippers, all of which aim at providing a tool which is easy to use, requires a relatively small operating force, and which can be manufactured relatively cheaply from few parts, without greatly compromising functionality. A further aim of many of these tools is to provide automatic adjustment so that no separate manual adjustment need be made to suit different wire diameters and insulation thicknesses.

One commercially successful wire stripper is described in EP-A-0,007,699. This tool has a pair of handles between which is mounted a complex cam mechanism arranged to close both a pair of wire clamping jaws and a pair of insulation stripping jaws, a link being arranged between one of the handles and the cam mechanism and which link together with the cam mechanism pass through a transition point between first and second stages of a stripping cycle. A disadvantage of this mechanism is that the velocity ratio between the handles and the stripping jaws is at its greatest when the stripping action is commenced, and at its smallest towards the end of the stripping cycle when the force required to displace the insulation is at its smallest. The consequence is that relatively high forces have to be applied to the handles in the initial stage of the stripping action, and that the length of insulation which may wholly be removed from the wire (as distinct from just displaced along the wire) is reduced. Those problems have already been considered for example in GB-B-2,077,517, which describes sophisticated cam mechanisms to optimise force transmission ratios for both the cutting and stripping stages.

In EP-A-0,309,871, there is described another similar kind of stripping tool. In this design, the stripping jaws are always connected to a control lever by a pivoted link, which link itself is constrained to move with a gripping jaw during a first stage of operation, and then to move away from the jaw during a stripping stage, to pull the stripping jaws through the link. The mechanism is complex and it is difficult to control the gripping force to be adequate for a wide range of wire sizes.

It is a principal aim of the present invention to address the above problems and so provide an improved design of wire stripper which requires relatively low operating forces and which has an improved stripping action.

According to the present invention, there is provided a wire stripper comprising:

first and second co-operable wire-clamping jaws relatively movable to clamp a wire there-between;

a pair of co-acting stripping jaws mounted between said clamping jaws for relative sliding movement along the length of a clamped wire, clamping movement of the clamping jaws closing the stripping jaws; and an operating mechanism including an actuator and drive means to effect an operating stroke having a first stage during which the wire-clamping jaws close to clamp a wire and the stripping jaws close to cut into insulation on the wire, and having a second stage during which the clamping jaws continue to clamp the wire and the stripping jaws perform sliding movement to effect stripping of the clamped wire;

characterised in that there is a pivotal connection between the actuator and the drive means, and the drive means is arranged to constrain the pivotal connection of the actuator to move along a locus having a directional component in the direction of sliding stripping movement of the stripping jaws the actuator being free of the stripping jaws so that the stripping jaws effect no sliding movement during said first stage of an operating stroke of the drive means, and the actuator then being coupled to the stripping jaws to cause the jaws to effect sliding stripping movement during said second stage, and in that the actuator together with the second clamping jaw form a cam mechanism through which the clamping jaws are closed during said first stage, but which cam mechanism allows the drive means to continue moving the pivotal connection of the actuator along said locus to effect sliding stripping movement of the stripping jaws following the clamping jaws encountering resistance to closing movement.

One particular embodiment of wire stripper of this invention comprises: a main body including a first wire-clamping jaw; a second-wire clamping jaw pivoted to the main body and co-operable with said first jaw; a pair of co-acting stripping jaws mounted between said clamping jaws for relative sliding movement along the length of a clamped wire, closing movement of the clamping jaws closing the stripping jaws; and an operating mechanism including a lever pivoted to the main body and an actuator directly pivoted to the lever about an axis displaced from the lever pivot and being coupled to the stripping jaws to effect sliding stripping movement thereof at least over a part of an operating stroke of the lever, the actuator together with the second clamping jaw forming a cam mechanism through which the second clamping jaw is moved towards the first clamping jaw during a first stage of an operating stroke of the lever, but which allows the lever to continue moving the actuator to operate the stripping jaws following the second clamping jaw encountering resistance to closing movement.

Most advantageously, the pivoted actuator and cam mechanism is arranged to increase the force imparted to the second clamping jaw as the lever performs an operating stroke, upon the stripping jaws encountering an increased resistance to sliding stripping movement. In this way, a kind of mechanical feedback loop is formed, to ensure that the clamping action on a wire to be stripped adequately matches the force being imparted by the stripping jaws, to strip insulation.

In a preferred embodiment, the pivoted actuator is coupled to the wire stripping jaws through a lost motion mechanism whereby the stripping jaws are not moved during a first stage of movement of the operating mechanism until the second clamping jaw encounters resistance to the closing movement thereof, either on contacting upon a wire to be stripped or on reaching an internal stop. The stripping jaws may be connected to a link which is slidably mounted in the main body and which couples to the actuator. In this case, the lost motion mechanism may be defined by a loose connection between the actuator and said link.

A spring may be arranged to urge the jaws to their initial position, before the stripping action commences. In this way, a relatively smooth operation may be achieved and by pre-loading the jaws, a sufficient pre-load may be imparted, initial closing of the clamping jaws sufficiently to grip a wire may be assured, before stripping proper commences.

By way of example only, one specific embodiment of wire stripper constructed and arranged in accordance with the present invention will now be described in detail, referent being made to the accompanying drawings, in which.

Figure 1:
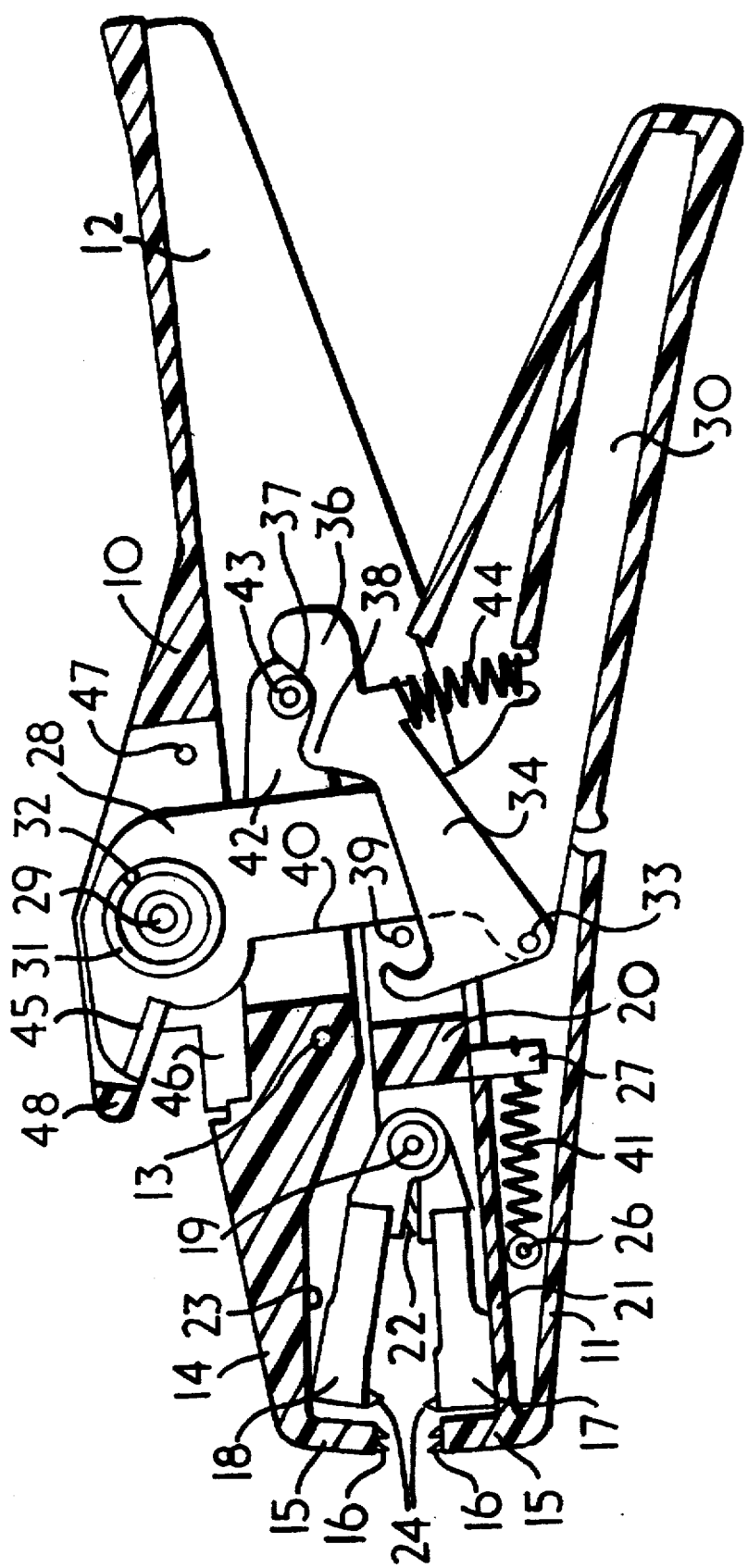
FIG. 1 is a diagrammatic cross-section through the embodiment of wire stripper, when in an initial position.

In the drawings, there is shown a hand-held and hand-operated wire stripping tool configured to allow the removal of a length of insulation from the end portion of a wire, upon actuation of the tool. The tool is self-adjusting in that it is able automatically to accommodate and remove insulation from a wide variety of wire sizes and types. The tool may however be modified to include an adjustment mechanism to allow the accommodation of an even wider variety of wire sizes and types.

The tool comprises a main body 10 which defines, to one side of the central region thereof, a first clamping jaw 11, and to the other side of the central region, a first handle 12. Pivoted about pin 13 is a second clamping jaw 14 which cooperates with the first clamping jaw 11, both jaws having nose portions 15 turned towards one another and having gripping teeth 16 formed on their confronting surfaces.

Between the first and second clamping jaws 11 and 14, there is mounted a pair of stripping jaws 17 and 18, both pivoted by a pin 19 to a slider 20. Both the slider 20 and stripping jaw 17 may slide along a surface 21 formed as a part of the main body. Stripping jaw 18 is urged by spring 22 disposed between the jaws 17 and 18 to engage an inside surface 23 of the second clamping jaw 14; closing movement of the second clamping jaw 14 towards the first clamping jaw 11 will thus also close the stripping jaws 17 and 18. Both stripping jaws 17 and 18 are formed with respective cutting edges 24, at their forward end. An extension coil spring 41 connected between a fixed pin 26 provided on the first clamping jaw 11 (being a part of the main body 10) and a leg 27 depending downwardly from slider 20 serves to urge the slider 20, and so in turn the stripping jaws 17 and 18, away from the handle—end of the tool (i.e. to the left in the drawings).

An operating lever 28 is pivoted to the main body 10 by shaft 29, and includes a second handle 30 opposed to the first handle 12. A torsion spring 31 is centred on shaft 29 and has one end turned axially to engage in a hole formed in the operating lever 28, and the other end 32 turned axially to engage in a hole formed in a cover plate (not shown). The spring 31 serves both as a return spring for the lever 28, and to urge that lever in the axial direction of shaft 29, for a purpose to be described below. From the position of the lever 28 in FIG. 1 it may be moved successively to the positions shown in FIGS. 2 and 3 by squeezing together the handles 12 and 30, against the action of spring. 31. On release of the second handle 30, the operating lever 28 will then return to its initial position shown in FIG. 1.

Directly pivoted to the lever 28 by a pin 33 is a pair of actuators 34, one each side of the lever 28 and each defining at one end portion a hook 35, and at its other end portion 36 a cam profile 37, 38. Two actuators are provided only to balance the forces to each side of the lever; the function of the tool will hereinafter be described with reference solely to one of the actuators. The hook 35 co-operates with a peg 39 provided within the slider 20 so as to draw the slider 20 to the right (in FIG. 1) on squeezing together the handles 12 and 30. On releasing the handles, lever 28 is returned by spring 31 to its initial position, and front edge 40 of the lever 28 pushes on the peg 39 so as to assist the return of the slider 20 to its initial position, the slider in any event being drawn by spring 41.

The second clamping jaw 14 includes a rearward extension 42 which carries a cam follower 43 in the form of a rotatable roller, engaged with the other end portion 36 of the actuator 34. A further spring 44 is provided between the actuator 34 and the second handle 30, to urge the actuator to a position where engagement is maintained between its end portion 36 and the cam follower 43.

The lever 28 is shaped to provide a cutting blade 45 co-operable with a second blade 46 mounted within the main body and secured in position both by shaft 29 and a peg 47. Spring 31 also serves to urge the blade 45 of lever 28 axially, into cutting engagement with blade 46. The main body is shaped to provide a guard 48 for the cutting blade 45, to minimise the likelihood of injury, when in use.

In use, a wire 49 is inserted end-wise into the tool when in its initial position as shown in FIG. 1, so that the wire lies between both the nose portions 15 of the clamping jaws 11 and 14 and between the stripping jaws 17 and 18. The handles 12 and 30 are squeezed together against the action of spring 31, so causing the actuator pivot pin 33 to swing about an arc centred on shaft 29, mounting the lever 28 on the main body 10. Spring 44 applies a counter-clockwise force to the actuator 34, so enabling the follower 43 to be nested in the cam profile 37 and thus to transfer motion to the second clamping jaw as the handles are squeezed together. The clamping jaws are closed in this way until the teeth 16 thereof engage a wire disposed therebetween. This closing action simultaneously closes the stripping jaws 17 and 18, the cutting edges 24 of which bite into the insulation of the wire. The tool is pre-set so that the cutting edges 24 are always closer together than the gripping teeth 16, but the geometry may be such that the amount by which the cutting edges are closer together than the gripping teeth 16 depends upon the instantaneous spacing between the gripping teeth 16. In this way, automatic compensation for an increased insulation thickness on a larger diameter wire may be achieved.

As resistance to closing of the clamping jaws is met, but with continued closing action of the handles 12 and 30, the cam follower 43 starts to ride out of part 37 of the cam profile, and on to the lobe of the cam profile 38. This turns the actuator 34 in a clockwise sense against the bias provided by spring 44; such actuator turning movement reduces any remaining clearance between hook 35 and peg 39. If, by the time this occurs, there is essentially no such clearance, then clockwise turning movement of the actuator 34 about pin 33 together with the movement of that pin itself will commence sliding movement of the slider 20. If the slider 20 had already started to slide because of the movement of pin 33, then this clockwise turning of the actuator will increase the sliding movement of the slider. However, initial movement of the slider is resisted by spring 4' until the force applied to the slider increases above the pre-load of that spring.

Figure 2:
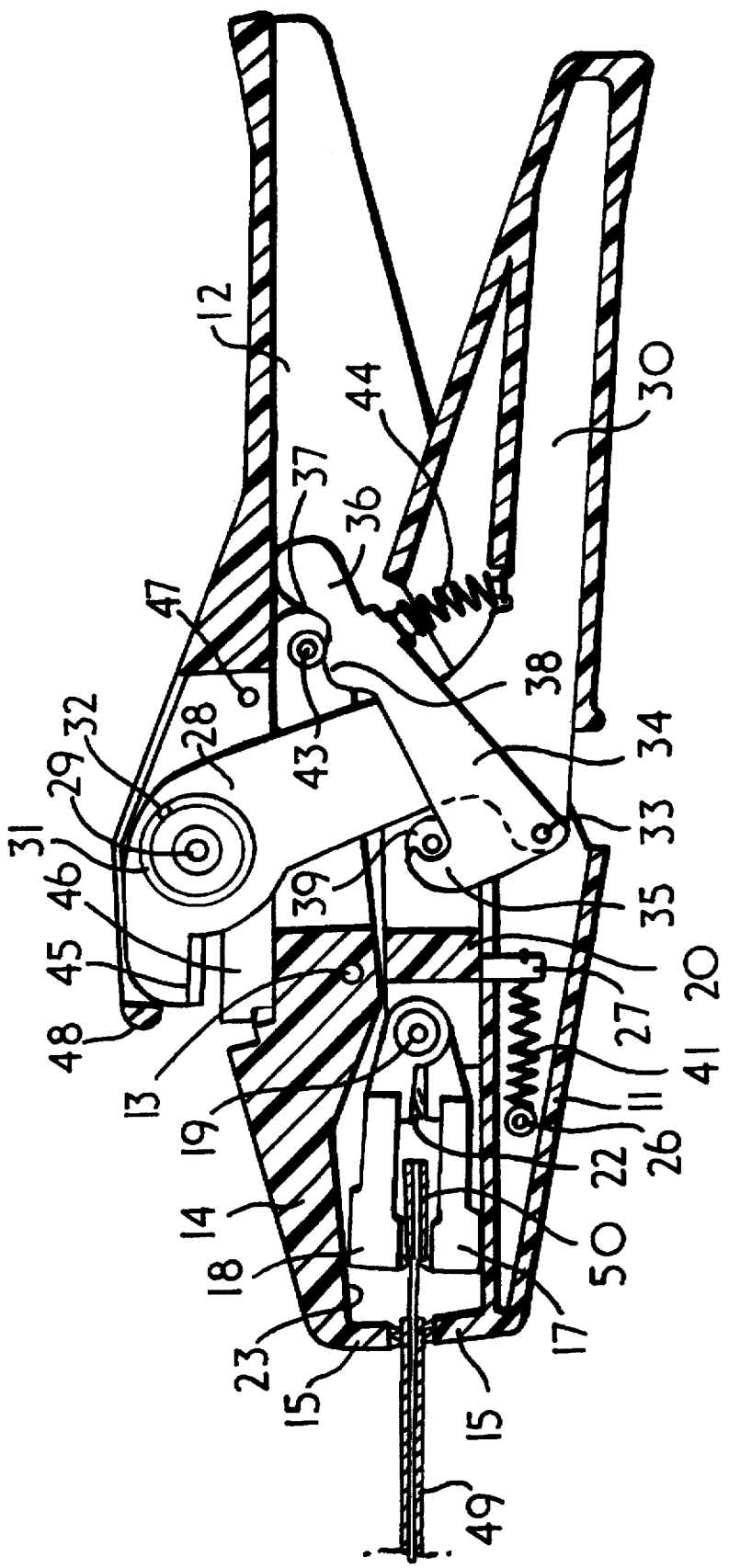
FIG. 2 is similar to FIG. 1 but when the tool is part-way through an operating strip and effecting a stripping action on a wire.

Continued movement of the handles draws the slider 20 to the right, to cause the stripping jaws 17 and 18 to perform a stripping action, as illustrated in FIG. 2. During this, there is "feed-back" between the stripping jaws and the clamping jaws, particularly during the initial stage of the stripping action when an end portion 50 of the insulation is being torn away from the major part of the insulation on the wire 49. Such resistance to the stripping jaws moving applies a rotative counter-clockwise force to the actuator 34 if lever 28 movement continues, and this in turn imparts a greater force to the cam follower 43, so urging the second clamping jaw 14 in a counter-clockwise direction more firmly to grip the wire 49 between the two clamping jaws.

Figure 3:
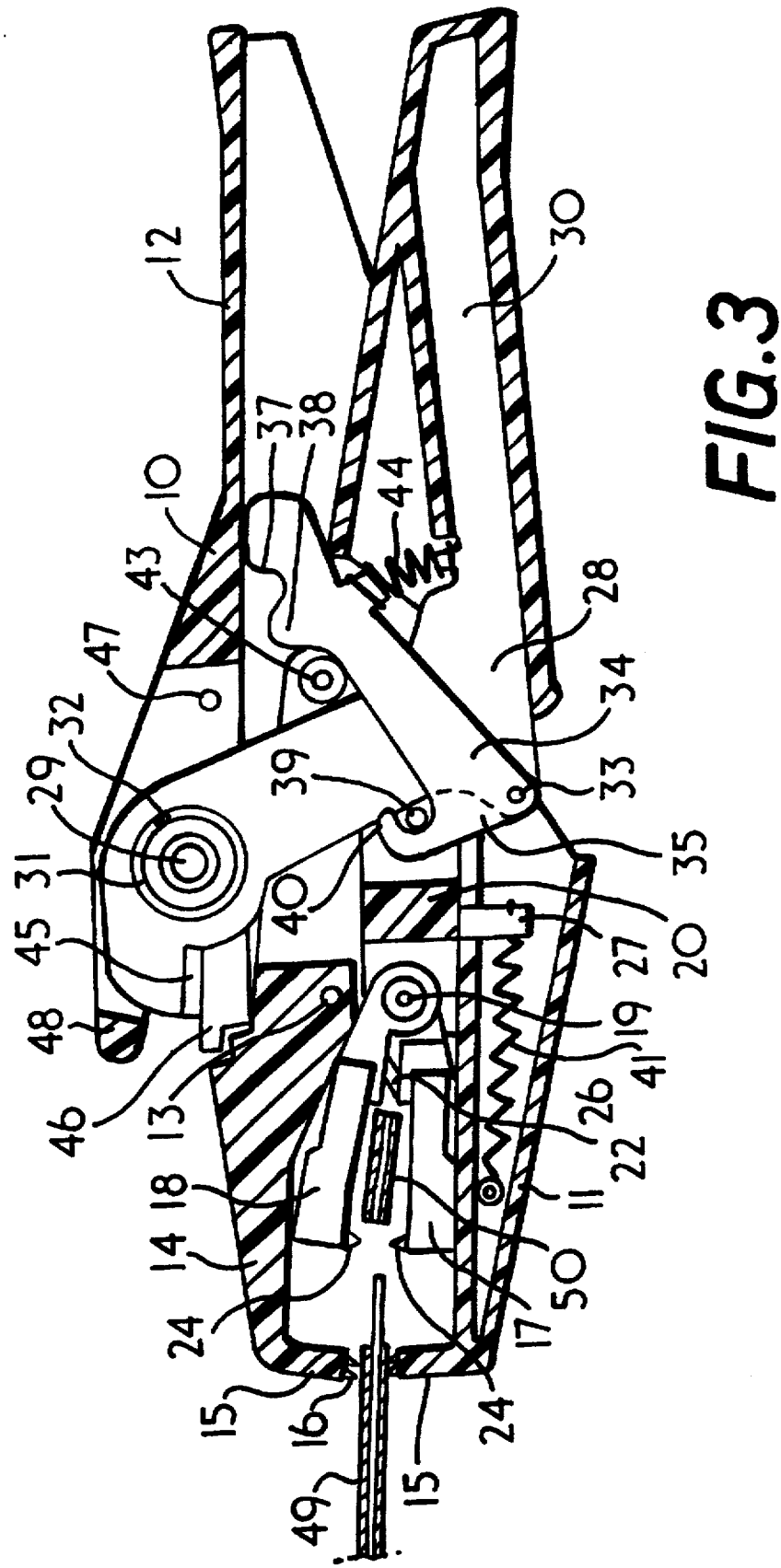
FIG. 3 is a further view similar to that of FIG. 1 but at the completion of a stripping stroke.

FIG. 3 illustrates the final stage of a stripping action, where the cam follower 43 rides fully over lobe 38 of the cam profile at end portion 36, so allowing the spring 22 between the stripping jaws 17 and 18 to urge the second clamping jaw 14 in a clockwise sense about pin 13, away from the first clamping jaw 11, and so release pressure from a gripped wire. Concurrently, the stripping jaws 17 and 18 open to release a stripped length 50 of insulation. Following removal of the wire from the tool, release of the second handle 30 allows the mechanism to return to the position illustrated in FIG. 1, due to the combined actions of springs 31 and 41.

The cutting blades 45 and 46 are of a hardened steel so that they may be used to cut a wire to a required length. During this, no wire should be located between the clamping jaws for stripping. Instead, a wire should be positioned between the cutting blades 45 and 46 and the handles squeezed fully together so as to cut the wire.

Particular advantages of the embodiment of tool described above are that the required force which must be applied to the handles in order to perform a stripping action may be much reduced as compared to many prior art wire stripping tools, since the force is effectively applied to the slider 20 to perform the stripping action. Moreover, the described "feedback" loop ensures that the clamping force matches the force required to effect removal of the end portion of the insulation, and over-clamping is avoided. A further advantage is that the length of wholly-removed stripped insulation may be significantly greater than can be obtained with comparable hand tools of the prior art, because there is no significant degradation of the velocity ratio between handle movement and the stripping jaws, as the stripping action progresses; as such, for a given handle movement, a greater movement of the stripping jaws may be achieved so removing a greater length of insulation, through an efficient use of the force applied to the handles 12 and 30.

In addition, the cutting blades are driven directly, unlike for example the arrangement of GB-B-2,077,517, so optimising the cutting action.

I claim:

1. A wire stripper comprising:
   a main body (10) including a first wire-clamping jaw (11);
   a second wire-clamping jaw (14) pivoted about a first axis (13) to the main body (10) and co-operable with said first jaw (11);
   a pair of co-acting stripping jaws (17,18) mounted between said clamping jaws (11,14) for relative sliding movement along the length of a clamped wire, closing movement of the clamping jaws (11,14) closing the stripping jaws (17, 18);
   an operating mechanism including a lever (28) pivoted to the main body about a second axis (29) displaced from said first axis (13) and an actuator (34) directly pivoted to the lever (28) about a third axis (33), which actuator acts on the second clamping jaw (14) during a first stage of an operating stroke of the lever (28) to effect closing of the clamping jaws (11,14) to clamp a wire, and which actuator (34) then acts on the stripping jaws (17,18) to effect sliding stripping movement of the stripping jaws during a subsequent second stage of the lever operating stroke during which the clamping jaws continue to clamp the wire; and
   a cam mechanism (37,38,43) having one part on the actuator (34) and an interacting part on the second clamping jaw (14) through which cam mechanism the second clamping jaw (14) is moved towards the first clamping jaw (11) during said first stage of the lever operating stroke, but which cam mechanism (37,38,43) allows the lever (28) to continue moving the actuator (34) to effect sliding movement of the stripping jaws following the second clamping jaw (14) encountering resistance to closing movement, and the actuator (34) being free of the stripping jaws (17,18) during said first stage but being coupled to the stripping jaws during said second stage to effect sliding stripping movement thereof.

2. A wire stripper as claimed in claim 1, wherein the cam mechanism (37,38,43) is arranged to increase the force imparted to the second clamping jaw (14) as the lever (28) performs an operating stroke, upon the stripping jaws (17, 18) encountering an increased resistance to sliding stripping movement.

3. A wire stripper as claimed in claim 2, wherein the cam mechanism comprises a cam follower (43) co-operating with a camming profile (37,38) arranged to resist movement of the follower (43) thereover until the second wire-clamping jaw (14) encounters resistance to closing.

4. A wire stripper as claimed in claim 3, wherein the camming profile (37,38) has a release portion over which the cam follower (43) runs as the lever (28) reaches the end of its operating stroke, the second clamping jaw (14) being freed to move away from the first clamping jaw (11) as the cam follower (43) runs over said release portion.

5. A wire stripper as claimed in claim 4, wherein the cam follower (43) is provided on the second clamping jaw (14) and the camming profile (37,38) is provided on the actuator (34).

6. A wire stripper as claimed in claimed in claim 3, wherein the third axis (33) pivoting the actuator (34) to the lever (28) is positioned with respect to the second axis (29) pivoting the lever (28) to the main body (10) so that said third axis (33) moves with a component in the direction of movement of the stripping jaws (17, 18) on pivoting of the lever (28) through both the first and second stages of an operating stroke.

7. A wire stripper as claimed in claim 1, wherein the third axis (33) pivoting the actuator (34) to the lever (28) is positioned with respect to the second axis (29) pivoting the lever (28) to the main body (10) so that said third axis (33) moves with a component in the direction of movement of the stripping jaws (17,18) on pivoting of the lever (28) through both the first and second stages of an operating stroke.

8. A wire stripper as claimed in claim 1, wherein the actuator (34) is coupled to the wire-stripping jaws (17,18) through a lost-motion mechanism (35,39) whereby the stripping jaws are not moved during said first stage of movement of the operating mechanism, said second stage commencing when the second clamping jaw (14) encounters resistance to the closing movement thereof.

9. A wire stripper as claimed in claim 1, wherein the stripping jaws (17,18) are pivoted to a link (20) which is slidably mounted in the main body (10) and which couples to the actuator (34) during said second stage.

10. A wire stripper as claimed in claimed in claim 9, wherein there is provided a lost-motion mechanism which couples the actuator (34) to the wire stripping jaws (17, 18)

whereby the stripping jaws are not moved during said first stage of movement of the operating mechanism, said second stage commencing when the second clamping jaw (14) encounters resistance to the closing movement thereof, said lost motion mechanism being defined by a loose connection between the actuator (34) and said link (20).

11. A wire stripper as claimed in claim 1, wherein the actuator (34) is spring-urged (44) to maintain the camming mechanism (37,38,43) in an operative condition.

12. A wire stripper as claimed in claim 1, wherein the lever (28) is spring-urged (31) to an end position of its pivoting movement, for commencement of an operating stroke.

13. A wire stripper as claimed in claim 1, wherein means (22) are provided to bias the stripping jaws (17,18) apart and to maintain each of those jaws in contact with the associated adjacent clamping jaw (11,14).

14. A wire stripper as claimed in claim 1, wherein means (41) are provided to resist sliding movement of the stripping jaws (17,18) away from their starting position at the commencement of an operating stroke.

15. A wire stripper as claimed in claimed in claim 1, wherein the cam mechanism includes a cam follower (43) provided on the second clamping jaw (14) and the cam mechanism further comprising a camming profile (37,38) provided on the actuator (34).

16. A wire stripper comprising:

a main body (10) including a first wire-clamping jaw (11);

a second wire-clamping jaw (14) pivoted about a first axis (13) to the main body (10) and co-operable with said first jaw (11);

a pair of co-acting stripping jaws (17,18) mounted between said clamping jaws (11,14) for relative sliding movement along the length of a clamped wire, closing movement of the clamping jaws (11,14) closing the stripping jaws (17,18);

an operating mechanism including a lever (28) pivoted to the main body about a second axis (29) displaced from said first axis (13) and an actuator (34) directly pivoted to the lever (28) about a third axis (33), which actuator acts on the second clamping jaw (14) during a first stage of an operating stroke of the lever (28) to effect closing of the clamping jaws (11,14) to clamp a wire, and which actuator (34) then acts on the stripping jaws (17,18) to effect sliding stripping movement of the stripping jaws during a subsequent second stage of the lever operating stroke during which the clamping jaws continue to clamp the wire; and a cam mechanism (37,38,43) comprising a camming profile (37,38) provided on the actuator (34) and a co-acting cam follower (43) provided on the second clamping jaw (14), through which cam mechanism the second clamping jaw (14) is moved towards the first clamping jaw (11) during said first stage of the lever operating stroke, but which cam mechanism (37,38,43) allows the lever (28) to continue moving the actuator (34) to effect sliding movement of the stripping jaws following the second clamping jaw (14) encountering resistance to closing movement, and the actuator (34) being free of the stripping jaws (17,18) during said first stage but being coupled to the stripping jaws during said second stage to effect sliding stripping movement thereof.

17. A wire stripper as claimed in claimed in claim 16, wherein the cam mechanism (37,38,43) is arranged to increase the force imparted to the second clamping jaw (14) as the lever (28) performs an operating stroke, upon the stripping jaws (17,18) encountering an increased resistance to sliding stripping movement.

18. A wire stripper as claimed in claimed in claim 17, wherein the camming profile (37,38) has a release portion over which the cam follower runs as the lever (28) reaches the end of its operating stroke, the second clamping jaw (14) being freed to move away from the first clamping jaw (11) as the cam follower runs over said release portion.

19. A wire stripper comprising:

a main body (10) including a first wire-clamping jaw (11);

a second wire-clamping jaw (14) pivoted about a first axis (13) to the main body (10) and co-operable with said first jaw (11);

a link (20) slidably mounted in the main body (10);

a pair of co-acting stripping jaws (17,18) pivoted to said link and mounted between said clamping jaws (11,14) for relative sliding movement along the length of a clamped wire, closing movement of the clamping jaws (11,14) closing the stripping jaws (17,18);

an operating mechanism including a lever (28) pivoted to the main body about a second axis (29) displaced from said first axis (13) and an actuator (34) directly pivoted to the lever (28) about a third axis (33), which actuator acts on the second clamping jaw (14) during a first stage of an operating stroke of the lever (28) to effect closing of the clamping jaws (11,14) to clamp a wire, and which actuator (34) then couples to said link to effect sliding stripping movement of the stripping jaws during a subsequent second stage of the lever operating stroke during which the clamping jaws continue to clamp the wire; and a cam mechanism (37,38,43) formed between the actuator (34) and the second clamping jaw (14), through which cam mechanism the second clamping jaw (14) is moved towards the first clamping jaw (11) during said first stage of the lever operating stroke, but which cam mechanism (37,38,43) allows the lever (28) to continue moving the actuator (34) to effect sliding movement of the stripping jaws following the second clamping jaw (14) encountering resistance to closing movement, and the actuator (34) being free of the stripping jaws (17,18) during said first stage but being coupled to the stripping jaws during said second stage to effect sliding stripping movement thereof.

20. A wire stripper as claimed in claimed in claim 19, wherein there is provided a lost-motion mechanism which couples the actuator (34) to the wire stripping jaws (17,18) whereby the stripping jaws are not moved during said first stage of movement of the operating mechanism, said second stage commencing when the second clamping jaw (14) encounters resistance to the closing movement thereof, said lost motion mechanism being defined by a loose connection between the actuator (34) and said link (20).

* * * * *